United States Patent
He

(10) Patent No.: US 9,773,277 B2
(45) Date of Patent: Sep. 26, 2017

(54) METHOD, TERMINAL, SERVER AND SYSTEM FOR INFORMATION REGISTRATION

(71) Applicant: Tencent Technology (Shenzhen) Company Limited, Shenzhen (CN)

(72) Inventor: Chang He, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 426 days.

(21) Appl. No.: 14/615,343

(22) Filed: Feb. 5, 2015

(65) Prior Publication Data

US 2015/0186994 A1    Jul. 2, 2015

Related U.S. Application Data

(63) Continuation of application No. PCT/CN2014/083658, filed on Aug. 5, 2014.

(30) Foreign Application Priority Data

Dec. 26, 2013 (CN) .......................... 2013 1 0731667

(51) Int. Cl.
G06Q 40/00 (2012.01)
G06Q 40/02 (2012.01)
G06Q 20/40 (2012.01)

(52) U.S. Cl.
CPC ......... *G06Q 40/02* (2013.01); *G06Q 20/4014* (2013.01)

(58) Field of Classification Search
CPC . G06Q 30/0601; G06Q 20/20; G06K 7/10554

(Continued)

(56) References Cited

U.S. PATENT DOCUMENTS

| 2005/0080693 A1 | 4/2005 | Foss et al. |
| 2008/0007388 A1 | 1/2008 | Au et al. |
| 2011/0022481 A1* | 1/2011 | Horvath ................. G06Q 20/20 |
| | | 705/16 |

FOREIGN PATENT DOCUMENTS

| CN | 1998032 A | 7/2007 |
| CN | 101076823 A | 11/2007 |

(Continued)

OTHER PUBLICATIONS

Tencent Technology, ISRWO, PCT/CN2014/083658, dated Nov. 13, 2014, 8 pgs.

(Continued)

*Primary Examiner* — Jamara Franklin
(74) *Attorney, Agent, or Firm* — Morgan, Lewis & Bockius LLP

(57) ABSTRACT

A method and associated terminal, server, and system for information registration, especially payment account registration processes involving payment transactions, are disclosed. By scanning tangible information carriers such as a driver license and credit cards, a client terminal such as a smart phone can generate an image that is sent to a registration server. The registration server can extract user identity information and payment account information from the image. After verifying that the user identity information is associated with a payment account, the registration server generates a registration code for the user and sends the registration code to the client terminal and a bank server. The bank server can then establish corresponding relationships between the registration code, a terminal identifier for the client terminal, and the payment account so that later payment requests from the client terminal can be processed more efficiently and securely.

20 Claims, 12 Drawing Sheets

(58) Field of Classification Search
USPC .......................................... 235/375, 379, 380
See application file for complete search history.

(56) References Cited

FOREIGN PATENT DOCUMENTS

| | | |
|---|---|---|
| CN | 102542470 A | 7/2012 |
| CN | 102722816 A | 10/2012 |
| TW | 201349143 A | 12/2013 |

OTHER PUBLICATIONS

Tencent Technology, IPRP, PCT/CN2014/083658, dated Jun. 28, 2016, 6 pgs.

* cited by examiner

METHOD, TERMINAL, SERVER AND SYSTEM FOR INFORMATION REGISTRATION

RELATED APPLICATIONS

This application is a continuation application of PCT Patent Application No. PCT/CN2014/083658, entitled "METHOD, TERMINAL, SERVER AND SYSTEM FOR INFORMATION REGISTRATION" filed on Aug. 5, 2014, which claims priority to Chinese Patent Application No. 201310731667.4, "Method, Terminal, Server and System for Information Registration," filed on Dec. 26, 2013, both of which are hereby incorporated by reference in their entirety.

TECHNICAL FIELD

The present disclosure relates to the field of computer technologies, and in particular to computer technology involving payment technology, more particularly to method, terminals, servers, and system for information registration.

BACKGROUND

With the development of computer technology, users can use terminal devices such as computers and mobile phones for online shopping. For payment transfers, the user can choose to open online banking accounts or utilize simplified payment methods to pay for the merchandise and/or services. In the payment processes, the user needs to manually input information such as payment card numbers, identifying number numbers, phone numbers, and account name, etc. The entire process is complicated, inconvenient, inefficient, and negatively impacts user experience.

SUMMARY

The above deficiencies and other problems associated with the existing technology are addressed by the techniques disclosed herein. In some embodiments, the application is implemented in a computer system that has one or more processors, memory and one or more modules, programs or sets of instructions stored in the memory for performing multiple functions. Instructions for performing these functions may be included in a computer program product configured for execution by one or more processors.

In one aspect, in a computer-implemented method performed by a registration server to conduct a payment account registration: the registration server receives an image from a client terminal, wherein the image is generated by the client terminal through scanning one or more information carriers provided by a user of the client terminal. After extracting user identity information and payment account information from the image, the registration server identifies a bank server based on the payment account information and verifies whether the user identity information is associated with a payment account identified by the payment account information. If the verification is successful, the registration server generates a registration code for the user and sends the registration code to the client terminal. In addition, the registration server sends the registration code and a terminal identifier to the bank server, wherein the terminal identifier identifies the client terminal, so that the bank server establishes corresponding relationships between the registration code, the terminal identifier, and the payment account for verifying subsequent payment requests by the client terminal.

In another aspect, the registration server includes memory, one or more processors, and one or more program modules stored in the memory and configured for execution by the one or more processors. The one or more program modules include: a receiving module configured to receive an image from a client terminal, wherein the image is generated by the client terminal through scanning one or more information carriers provided by a user of the client terminal; an extracting module configured to extract user identity information and payment account information from the image; an identification module configured to identify a bank server based on the payment account information; a verifying module configured to verify whether the user identity information is associated with a payment account identified by the payment account information; a generating module configured to generate a registration code for the user if the verification is successful; a first transfer module configured to send the registration code to the client terminal; and a second transfer module configured to send the registration code and a terminal identifier to the bank server, wherein the terminal identifier identifies the client terminal, so that the bank server establishes corresponding relationships between the registration code, the terminal identifier, and the payment account for verifying subsequent payment requests by the client terminal.

In another aspect, a non-transitory computer readable storage medium having stored therein instructions, which when executed by a computer system, e.g. a registration server, cause the computer system to perform the method described herein.

Some embodiments may be implemented on either the terminal side or the server side of a terminal-server network environment.

BRIEF DESCRIPTION OF THE DRAWINGS

The aforementioned features and advantages of the application as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Figure 1:
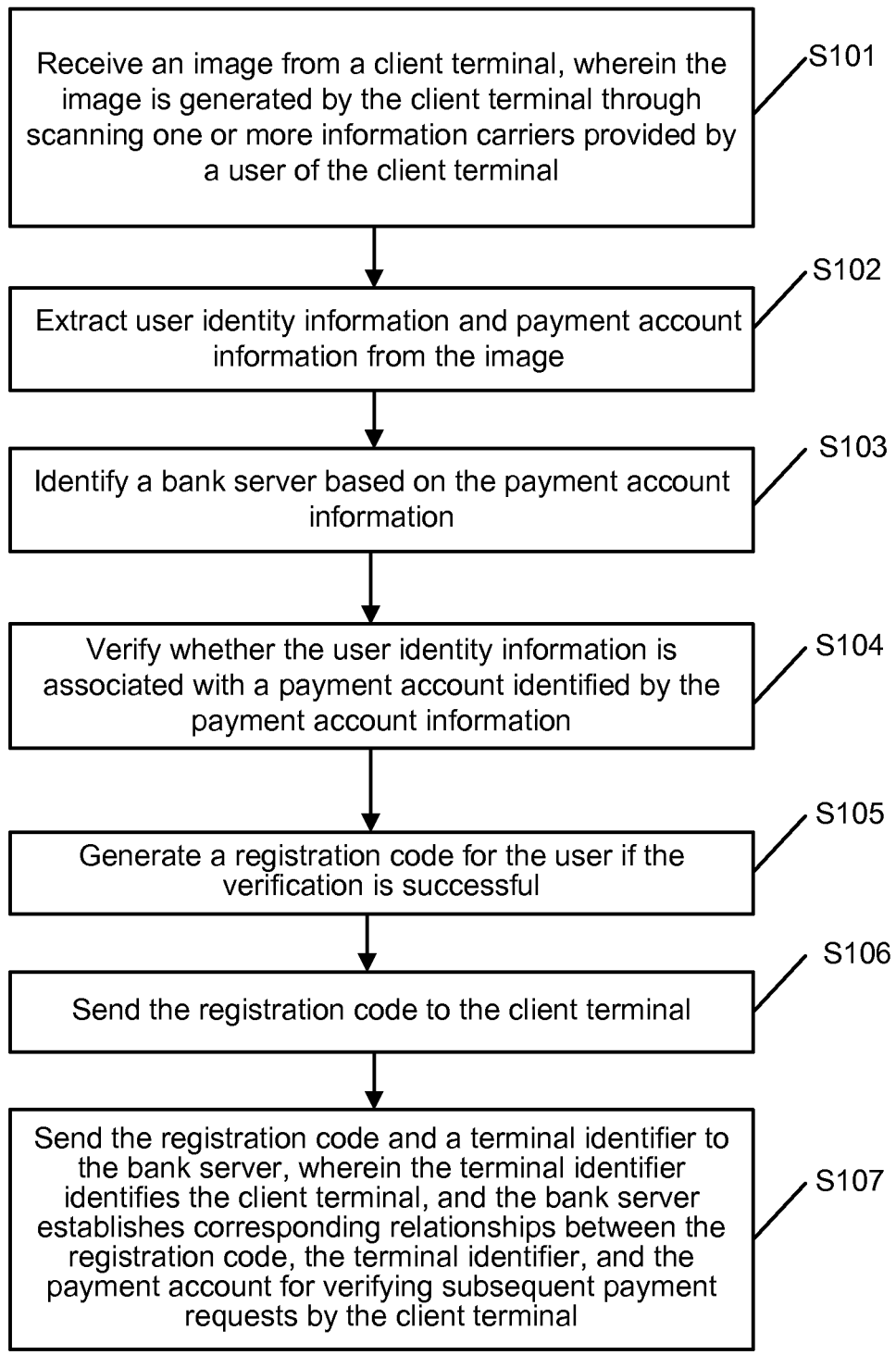
FIG. 1 is a flowchart of an information registration method in accordance with some embodiments.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The information registration method described herein aims to provide a quick and convenient online payment registration process. For example, the user can scan information carriers such as personal identity cards and credit cards to generate an image; by processing the image, user identity information and payment account information can be extracted; after verification of the information, a registration server can use the extracted information to register the user and the payment account; subsequent online payment requests can be processed based on the registration, making the payment process more streamlined and convenient, allowing the user to avoid most or all manual inputs, and simplifying the entire registration-payment process.

In some embodiments, the client terminal may be any terminals that have basic computing and communication capabilities and can acquire information, such as by scanning tangible information carriers (e.g., via a built-in scanner or camera). For example, the client terminal may be tablet PCs, mobile phones, electronic readers, PDAs (personal digital assistants), personal computers (PC), notebook computers, vehicle computer units, wearable devices, or POS terminal and other smart devices. The registration server according to some embodiments may be any computing device that have computing and network capabilities. For example, the registration server can be a server for a communication program (e.g., a social network client application, an online commerce application, etc.) installed on the client terminal.

In some embodiments, the information carriers are tangible items that can carry information in visible form. For example, the information carriers can be personal identification cards (e.g., resident's ID cards, driver's license, passports, membership cards, etc.) and payment cards (e.g., credit cards, debit cards, pre-paid gift cards, etc.). The personal identification cards may be any card that provides at least some identity information as text or image form (e.g., as a barcode, a logo, etc.) printed or engraved on the cards. For example, the personal identification card can be a government issued ID, an employer issued ID, a driver license, or a passport with the user's name and other identity information in textual or image form (either plainly visible, or encrypted or encoded in some fashion). The payment card can be a credit card, a debit card, a discount card, a gift card, or the like.

Figure 2:
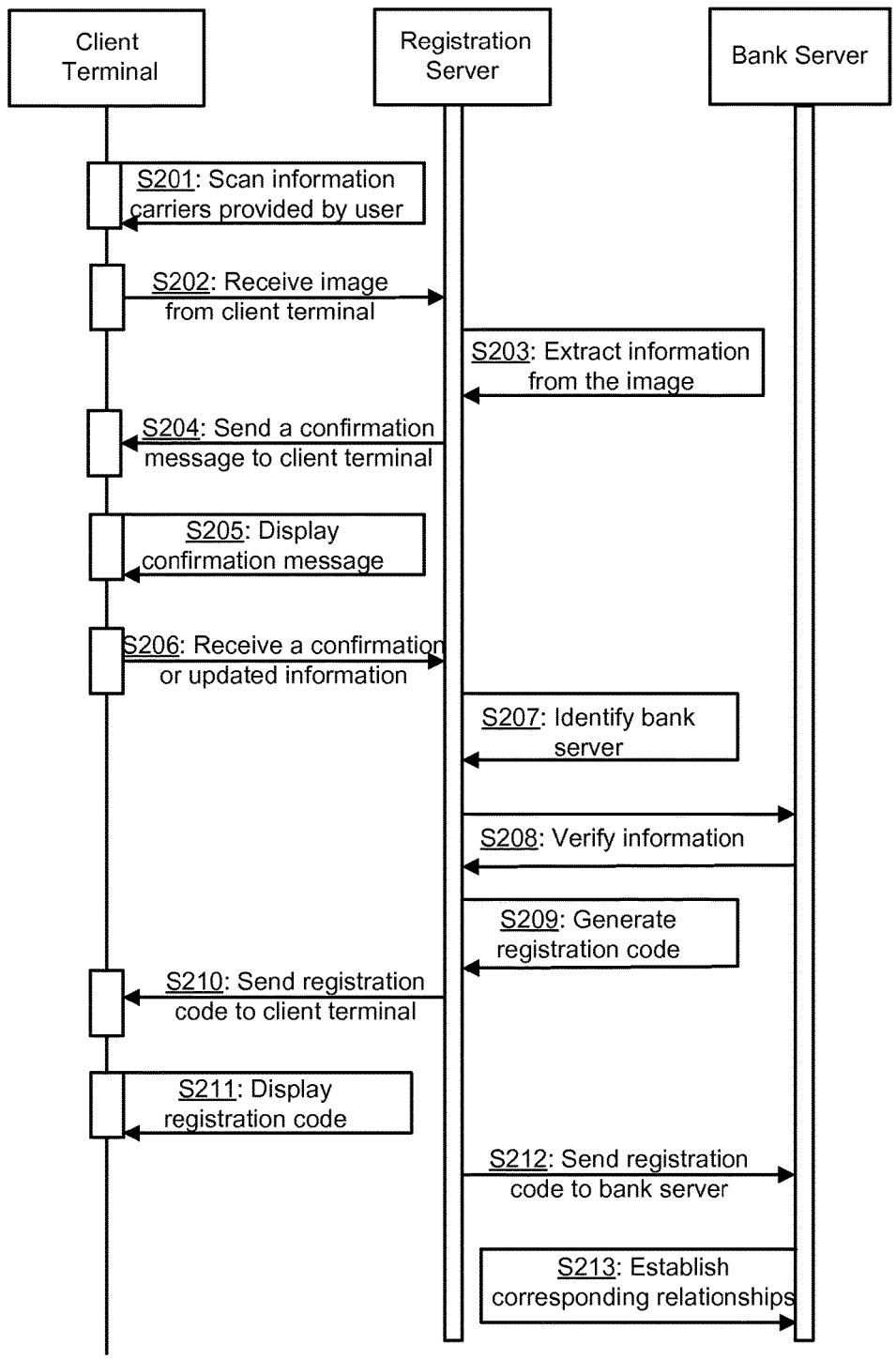
FIG. 2 is a schematic illustration of an information transmission method, showing how a client terminal, a registration server, and a bank server interact in accordance with some embodiments.
Figure 4:
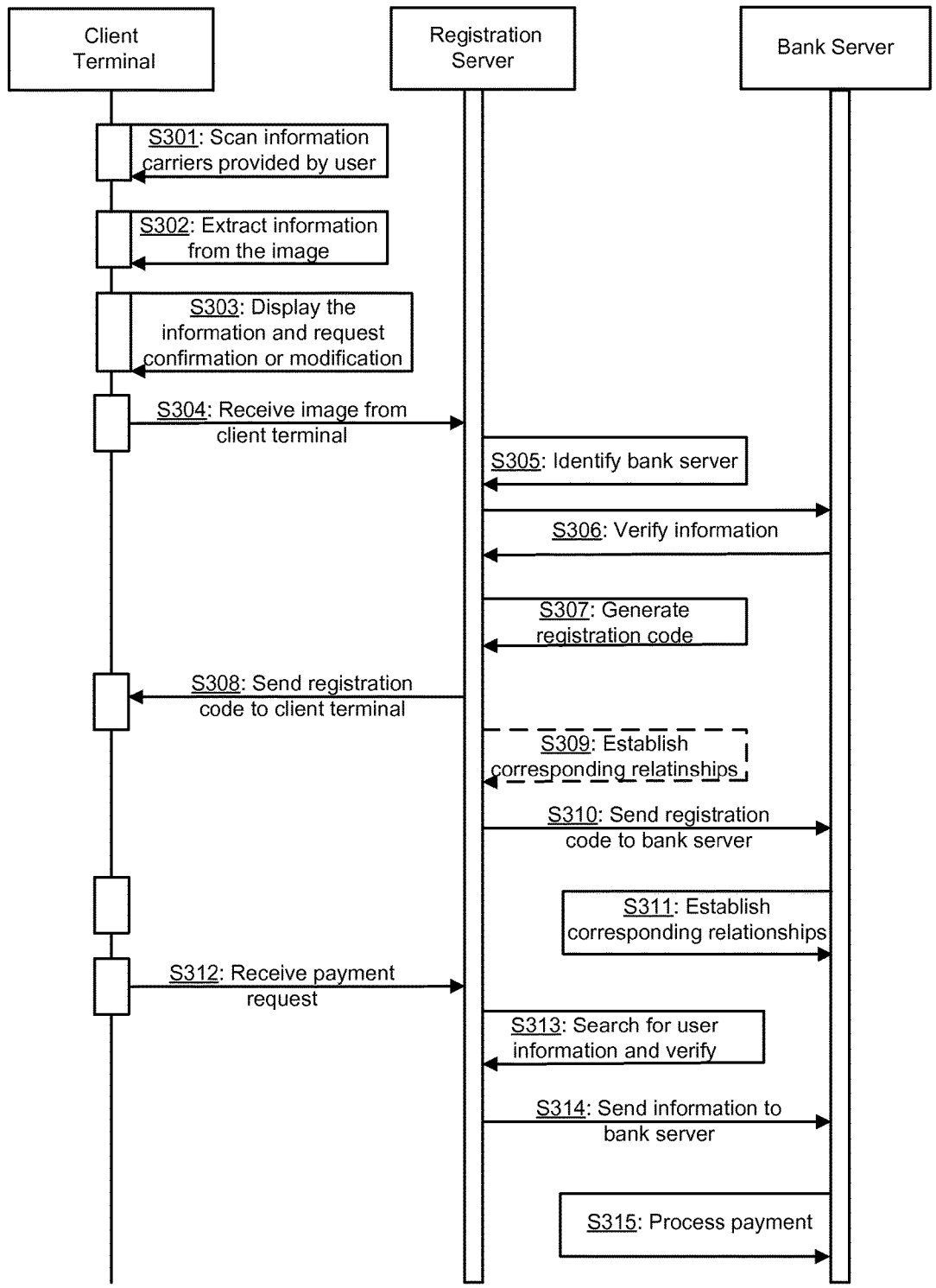
FIG. 4 is a schematic illustration of an information transmission method, showing how a client terminal, a registration server, and a bank server interact in accordance with some embodiments.
Figure 5:
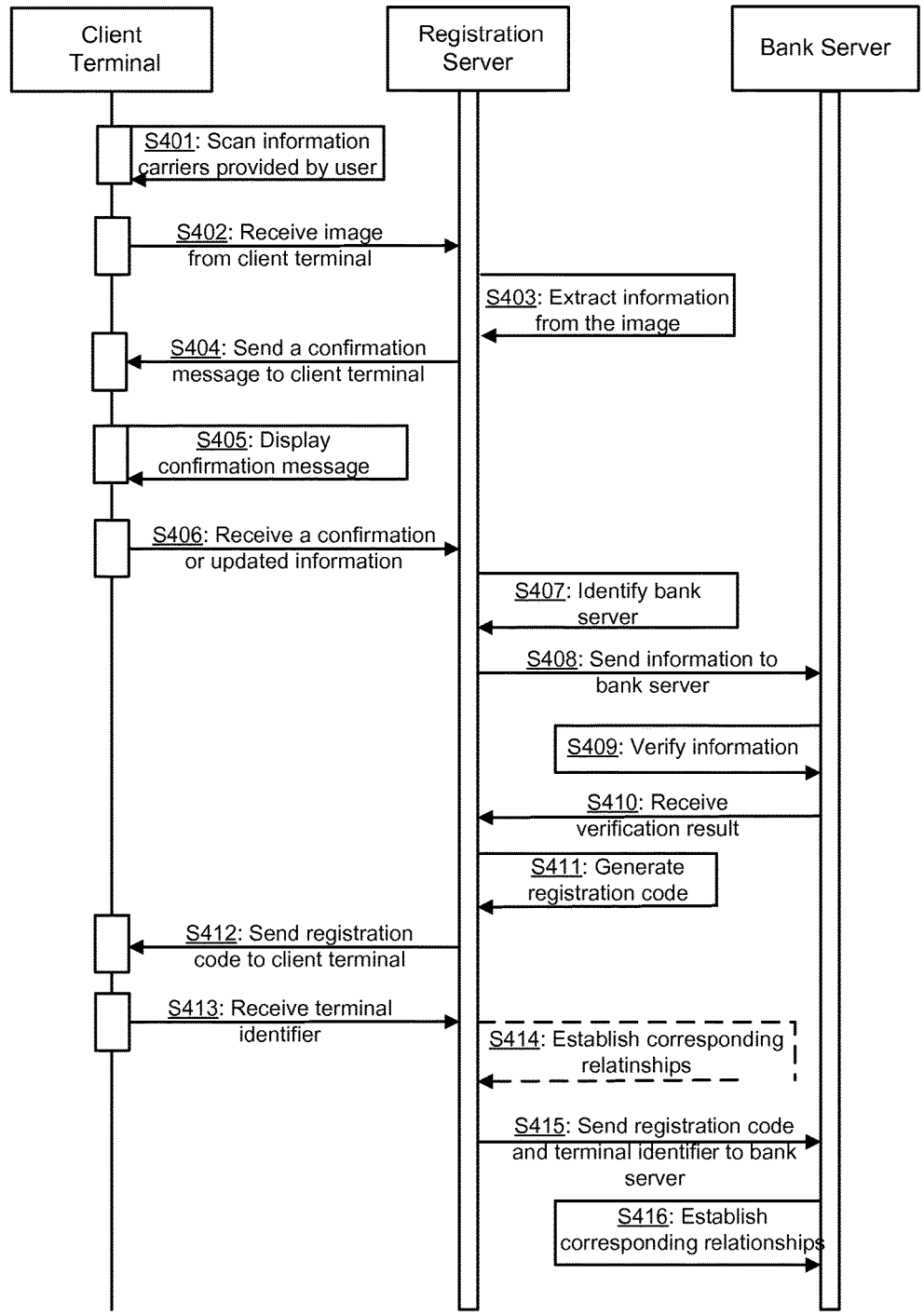
FIG. 5 is a schematic illustration of an information transmission method, showing how a client terminal, a registration server, and a bank server interact in accordance with some embodiments.

FIG. 1 is a flowchart illustrative of the information registration method in accordance with some embodiments. FIG. 2 is a schematic illustration of an information transmission method, showing how a client terminal, a registration server, and a bank server interact in accordance with some embodiments. In FIGS. 2, 4 and 5, for any step involving the registration server and another device, the action is describe from the perspective of the registration server.

As shown by step S101 of FIG. 1, also referring to steps S201 and S202 of FIG. 2, the registration server may receive an image from a client terminal. In some embodiments, the image is generated by the client terminal through scanning one or more information carriers provided by a user of the client terminal.

As indicated, in some embodiments, the information carriers are tangible items, e.g. personal identification cards and payment cards that can carry information. In some embodiments, the personal identity card carry information such as the user's name, contact information such as address and phone number, date of birth, and other information, e.g. brief description of physical features such as height, eye color, and ethnicity, that can be used to assist authentication of identity. In some embodiments, the personal identity card carries a signature or a reprint of the user's fingerprint. In general, the personal identity card of the user carries user identity information. In some embodiments, the personal identity card carries a unique identifying number such as an identifying number. In some embodiments, the payment card, such as a bank debit card, can carry information such as a card holder's name, a name of the card issue such as XX Bank, a unique card identifier such as a card number, an expiration date, and other codes or passwords that can assist authentication of the card and the account associated with the card. In general, the payment card carries payment account information.

In some embodiments, the information carriers can display information that is encrypted. For example, the information carriers can bear a codes or images such as but not limited to two-dimensional codes, bar codes, logos, anti-counterfeit images and labels, and near field communication (NFC) tags. The client terminal can scan the encrypted images or codes to generate an image. It should be noted that, a camera of the client terminal and a scanning application in the client terminal can be used to scan the information carriers, and the scanning application can be part or a plug-in of a social networking client application installed in the client terminal. In some embodiments, the registration server is the server operating the social networking server software for the social networking client application.

It should also be noted that the extracted information may or may not comprise entirely of texts and digits. For example, the user identity information may include a signature of the user in an image format. The user identity information may also include information embodying physical features. For example, the user identity information may include fingerprint information of the user, wherein the fingerprint information can be kept in an image format or other formats. In some embodiments, the user identity information may include voice print information. For example, the information carriers may have audio playing functions and voice signals can be acquired by the client terminal by recording the signals played by the information carriers and processed to generate voice print information.

The image, after being generated by the client terminal, may or may not be encrypted by the client terminal. The image, either encrypted or not, can be processed by the client terminal or can be sent by the client terminal to a registration server for further processing. In some embodiments, as shown in FIG. 4, the client terminal processes the image and extract needed information from the image. Such information can be sent to the registration server. In some embodiments, as shown in step S102 of FIG. 1, the processing is conducted by the registration server.

Figure 3B:
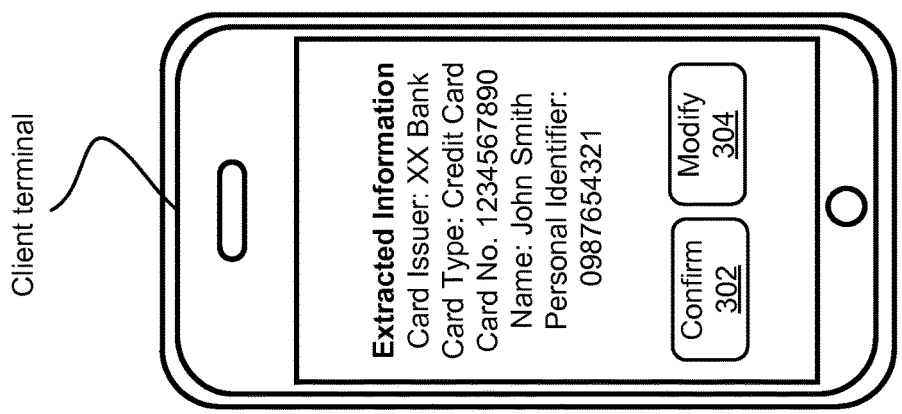
FIG. 3B is an illustration of the client terminal displaying a confirmation message in accordance with some embodiments.
Figure 3A:
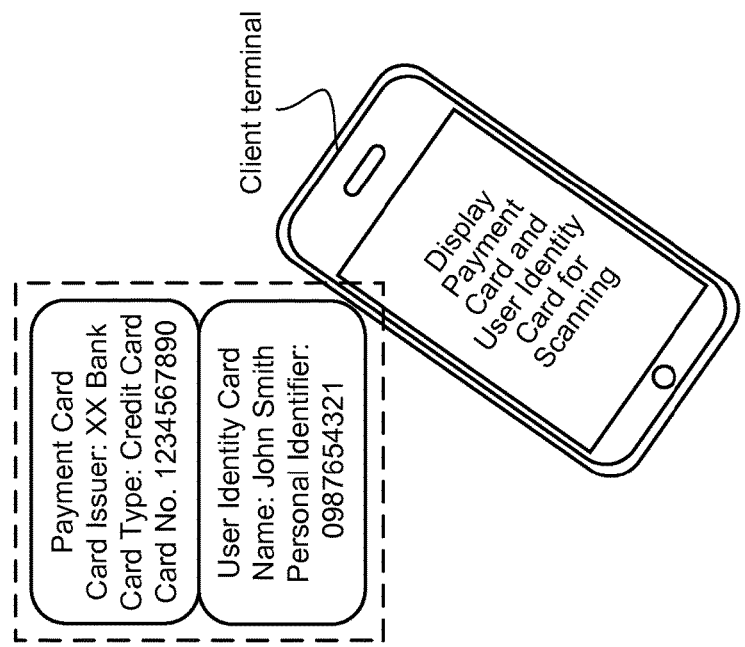
FIG. 3A is an illustration of the client terminal scanning the information carriers in accordance with some embodiments.

FIG. 3A is an illustration of the client terminal scanning the information carriers in accordance with some embodiments. The information carriers may include more or fewer cards or other carriers than illustrated in FIG. 3A. In FIG. 3A, the information carriers include two cards: a personal identity card, e.g. driver license, and a payment card, e.g. credit card. In other embodiments, other information carriers, at least as identified above, can also be used. It should also be noted that the information carried by the information carriers are examples only and may comprise more or less information related to the user and the payment account. In FIG. 3A, the personal identity card carries information such as user name and personal identifier. The personal identity card can also carry information as such signatures and physical features. In FIG. 3A, the payment card carries information including: card issuer, e.g. name of the bank issuing the card, card type, and card number. In some embodiments, the card issuer and card type are not included in the information carried by the payment card and the card issuer and card type can be ascertained by the card number.

In FIG. 3A, the information carriers are provided at the same time. However, it should be noted that the specific manner that the information carriers are presented can vary. For example, the client terminal may request the user to present the information carriers one at a time in specific sequences and with specific positioning and orientation. For example, the client terminal may present an interface and ask the user to present first a user identity card; after scanning the user identity card, the interface may request the user to present a payment card for scanning.

As shown by step S102 of FIG. 1, also referring to step S203 of FIG. 2, the registration server may extract user identity information and payment account information from the image.

As indicated, in some embodiments, the scanned image is sent to the registration server and the registration server extracts user identity information and payment account information from the image. In some embodiments, the extracting process may involve electronic conversion of scanned or photographed images into computer-readable text, e.g. optical character recognition (OCR) technologies. If the image is encrypted by the client terminal before being sent to the registration server, the registration server may decrypt the encrypted image before the extraction of user identity information and payment account information.

In some embodiments, the extracted information needs to be confirmed or modified by the user to ensure that the information is correct. As shown by steps S204 and S205 of FIG. 2, the registration server may send a confirmation message to the client terminal for display at the client terminal. In some embodiments, the confirmation message comprises the user identity information and payment account information extracted from the image, and requests the user to confirm or modify the extracted user identity information and bank account information.

FIG. 3B is an illustration of the client terminal displaying a confirmation message in accordance with some embodiments. As shown in FIG. 3B, after the client terminal receives the confirmation message, the client terminal displays the confirmation message and presents an interface to the user so that the user can review the extracted user identity information and payment account information and provide a confirmation or modification. The interface shown in FIG. 3B includes the extracted information, a confirm button 302 and a modify button 304. The user can choose to confirm if the extracted information is correct; the user can choose to modify the extracted information if the user believes the information is incorrect. In some embodiments, the user can choose to re-scan the information carriers, manually input the corrections, or choose a different way to modify the extracted information. In some embodiments, the interface may also allow the user to cancel the registration process.

As indicated, the image may be processed by the client terminal or registration server. If the user identity information and payment account information is extracted by the registration server, the registration server optionally sends the extracted information to the client terminal for confirmation or modification. In some embodiments, the user identity information and the payment account information is extracted by the client terminal, then the client terminal can display an interface so request the user to confirm or modify the extracted information.

As shown by step S206 of FIG. 2, in some embodiments, the registration server may receive updated information or a confirmation from the client terminal. In some embodiments, the registration server receives a confirmation from the client terminal if the user confirms the user identity information and bank account information at the client terminal. In some embodiments, the registration server receives updated user identity information and bank account information from the client terminal if the user modifies the extracted user identity information and bank account information at the client terminal. In addition, the registration server may replace the extracted user identity information and bank account information with the updated user identity information and bank account information.

If the client terminal extracts the information from the information carriers, presents the extracted information to the user for confirmation or modification, and receives the confirmation or modification, the client terminal can send the finalized user identity information and payment account information to the registration server. The finalized user identity information and payment account information can be sent with an indication that the information has been confirmed or modified (and then confirmed) by the user and the information can be used directly for the subsequent steps.

As shown by step S103 of FIG. 1, also referring to step S207 of FIG. 2, the registration server may identify a bank server based on the payment account information.

In some embodiments, the payment account information includes a card number of a payment account. Based on the card number, the registration server may identify a bank server that may allow further communications and inquiries to be made. In some embodiments, the payment account information also includes information such as the name of the bank and other securitized information such as an access code (e.g., a pin). The name of the bank and other information may be used by the registration server to identify the bank server. As indicated, in some embodiments the client terminal extracts information such as user identity information and payment account information from the image. Similarly, step S103 in some embodiments may be performed by the client terminal, so that the client terminal identifies a bank server based on the payment account information and information related to the bank server, such as a bank server identifier, e.g. IP address, may be sent to the registration server. And the registration server uses the bank server identifier to identify the bank server.

It should be noted that the bank server is not limited to servers provided by a bank. The bank server refers to servers that stores or manages accounts that can be used for payment transactions (e.g., transfer of cash or funds). The bank server may be managed by a bank, a transaction platform, or a buyer/seller.

As shown by step S104 of FIG. 1, also referring to step S208 of FIG. 2, the registration server may verify whether the user identity information is associated with a payment account identified by the payment account information. The identification of the payment account may be conducted by the bank server or the registration server. In some embodiments, the registration server has previously save information related to the payment account. In some embodiments, the registration server sends the payment account information to the bank server so that the bank server can identify the payment account.

In essence, the registration server needs to verify that the user is authorized to access the funds in a payment account that is associated with the payment account information. In some embodiments, the registration server may be able to conduct the verification based on information that is already saved in the registration server. For example, if the user has entered the payment account information and the user identity information manually before into the registration server and the registration server has saved and verified such information, then when the user wants to input information with scanning, the registration server may access the previously saved information and use such information as a basis for determining whether the user is authorized. Such access may be conducted by searching with the payment account information or the user identity information. In some embodiments, the search may be conducted with an approximation algorism because there can be errors in extracting the payment account information and the user identity information from the image. If a perfect match cannot be found, the registration server may inquire the user to make modifications to the extracted information so that the errors, if any, can be corrected.

In some embodiments, the verification can be conducted by the registration server with information acquired from the bank server. After identifying the bank server, the registration server may connect to the bank server and make inquiries related to a payment account and the user. For example, the registration server may send an inquiry to the bank server, wherein the inquiry includes the payment account information and/or the user identity information, as well as a request that the bank server sends back related information to the registration server. In particular, the bank server may provide application programming interfaces (API) that can be accessed by the registration server to obtain the necessary information for verification. The bank server may search for related information, e.g. searching for saved user identity information if the payment account information is sent from the registration server, or searching for saved payment account information if the user identity information is sent from the registration server. The bank server can send back the saved information to the registration server so that the registration server can compare the saved information with the extracted information and conduct the verification.

Before, after or during the verification process, the registration server may save the user identity information and payment account information. For example, the registration server saves the information and establishes a corresponding relationship between the user identity information and payment account information.

If the verification is not successful, indicating that the user identity information is not associated with the payment account identified by the payment account information, the registration server can take different approaches to terminate or continue the registration process. For example, the registration server may send a message to the client terminal and urge the user to re-enter manually the information or re-scan the information carriers. Alternatively, the registration server may terminate the registration process, providing notice to the client terminal so that the client terminal can display the notice and inform the user that the registration process has been terminated because the information provided cannot be verified.

As shown by step S105 of FIG. 1, also referring to step S209 of FIG. 2, the registration server may generate a registration code for the user if the verification is successful. As indicated, the registration server may save the user identity information and payment account information. After the generation of the registration code, the registration server may establish a corresponding relationship between the user identity information, the payment account information, and the registration code.

If the verification is successful—the user identity information is associated with the payment account identified by the payment account information, the registration server can proceed with the registration process so that the user may make simplified payments later. The registration server may generate a registration code that can be used by the client terminal to facilitate later payment transactions. In some embodiments, the registration code can comprise a user name and password which can or cannot be modified by the user. The user can used the user name and password for later access of the payment account. In some embodiments, the registration server can use the phone number of the client terminal when the client terminal is a smart phone having a phone number. The phone number is associated with the user and can be used as the registration code. The phone number is a particularly good choice in some embodiments because it provides an added benefit of linking the registration code with a device (e.g., the mobile phone associated with the phone number) on which additional verification of information (e.g., user identity and payment account information) can be requested by the bank server. In some embodiments, the registration code can be a device identification number of the client terminal. The registration code can comprise a random code, name, or identifier generated for the user and the payment account. For example, for each verified payment account or user, the registration server can generated a unique 10 digit code that can be used for later payment transactions.

As shown by step S106 of FIG. 1, also referring to step S210 of FIG. 2, the registration server may send the registration code to the client terminal.

In some embodiments, the registration server may inquire as to whether the user would want to change the registration code and provide an interface so that the user can change the registration code, making it more personalized and easier for the user to remember. In some embodiments, the registration server sends the registration code to the client terminal so that the client terminal can display the registration code, as shown by step S211 of FIG. 2. Displaying the registration code makes it possible for the user to record or remember the registration code. In some embodiments, the registration code is not displayed by the registration server. The registration server saves the registration code and uses the registration code for the same user as a default set up for further payment transactions.

As shown by step S107 of FIG. 1, also referring to step S212 of FIG. 2, the registration server may send the registration code and a terminal identifier to the bank server.

The terminal identifier is a unique identifier that can be used to identify the client terminal. In some embodiments, the terminal identifier is a phone number associated with the client terminal when the client terminal is a phone. The terminal identifier can also be other codes or identifier such as but not limited to: a number or code specifically assigned to the client terminal by the registration server, login information associated with an account for a program, e.g. a social networking program, installed in the client terminal, a device identifier for the client terminal such as a serial number. In some embodiments, the terminal identifier is sent directly from the client terminal to the bank server. The registration server, after generating the registration code, may send a request to the client terminal so that the client terminal can send the terminal identifier to the bank server. In such a manner, the terminal identifier is not exposed as it is sent on platforms such as short messages or emails, making the registration process and payment process more secure.

As shown by step S107 of FIG. 1 and also referring to step S213 of FIG. 2, in some embodiments, the terminal identifier can be used to identify the client terminal. The bank server establishes corresponding relationships between the registration code, the terminal identifier, and the payment account for verifying subsequent payment requests by the client terminal.

After registration, subsequent payment transactions can be conducted more efficiently and conveniently. For example, when a payment is required for an offline shopping, where the payment involves an tangible object (for example, a chair or bottled water) or an intangible object (for example, a phone bill or online payment currency), the client terminal may send a payment request to the registration server, wherein the payment request includes a payment amount, the terminal identifier, and the registration code. After receiving the payment request from the client terminal, the registration server may verify the payment request and send the payment request to the bank server. In some embodiments, the bank server processes a payment from the payment account based on the payment request, using the funding from the payment account. In some embodiments, the payment processing may include: deduction of the payment amount from the payment account and sending prompting information related to the payment transaction to the registration server and the client terminal.

In some embodiments, the client terminal sends the an image after scanning information carrier to the registration server, the registration server extracts user identity information and payment account information from the image and verifies that the user identity information is associated with a payment account identified by the payment account information. The registration server generates a registration code for the user and sends the registration code to the client terminal and a bank server. The banker server associates the registration code, the payment account, and a terminal identifier so that subsequent payment requests can be processed more efficiently and conveniently.

FIG. 4 is a schematic illustration of an information transmission method, showing how a client terminal, a registration server, and a bank server interact in accordance with some embodiments.

As shown by step S301 of FIG. 4, the client terminal scans one or more information carriers provided by a user of the client terminal to generate an image.

As shown by step S302 of FIG. 4, the client terminal processes the image and extracts information, such as user identity information and payment account information, from the image. The embodiments presented by FIG. 4 provide alternatives to the embodiments shown in FIG. 2. The user identity information and payment account information, as shown in FIG. 4, are extracted by the client terminal, avoiding sending the image to the registration server. In some embodiments, the extracted information can be encrypted before being sent to the registration server, improving the security of the transfer.

As shown by step S303 of FIG. 4, the client terminal displays the extracted information and requests the user to confirm the displayed information or choose to modify the information. The interface displayed by the client terminal may be similar as the showing of FIG. 3B. If the user confirms the extracted information, the client terminal proceeds with step S304. If the user modifies the extract information, e.g. user identity information and payment account information, the client terminal updates the information and proceeds to step S304 with the updated information.

As shown by step S304 of FIG. 4, the registration server receives the information from the client terminal. The information may be sent along with a request for a registration that can facilitate future payments. In addition, the registration server may also receive a message from the client terminal that the information has been confirmed or updated.

As shown by step S305 of FIG. 4, the registration server identifies a bank server based on the payment account information.

As shown by step S306 of FIG. 4, the registration server verifies whether the user identity information is associated with a payment account identified by the payment account information. The verification can be conducted by the registration server, as shown in FIG. 4. Alternatively, the verification can be conducted by the bank server. The verification process may involve information exchanges between the registration server and the bank server. For example, the registration server may acquire saved information, e.g. saved user identity information, from the bank server, wherein the save user identity information has been located by searching with the payment account information provided by the registration server to the bank server. Then the registration server compares the saved user identity information with the user identity information provided by the client terminal. If the information matches then the verification is successful. Otherwise, the verification is unsuccessful and the registration server can terminate the registration process or require the user to re-enter the information, either manually or with re-scanning.

As shown by step S307 of FIG. 4, if the verification is successful, the registration server generates a registration code for the user and the client terminal.

As shown by step S308 of FIG. 4, the registration server sends the registration code to the client terminal.

As shown by step S309 of FIG. 4, in some embodiments, the registration server establishes corresponding relationships between the registration code, the user identity information, and the payment account information. In some embodiments, the registration server acquires the terminal identifier from the client terminal and establishes corresponding relationships between the payment account information, the registration code, and the terminal identifier.

As shown by step S310 of FIG. 4, the registration server sends the registration code to the bank server. In some embodiments, the registration server also sends the terminal identifier to the bank server. In some embodiments, the client terminal sends the terminal identifier to the bank server.

As shown by step S311 of FIG. 4, the bank server establishes corresponding relationships between the payment account, the terminal identifier, and the registration code.

Steps S312-S315 provide examples for a subsequent payment transaction after the registration process.

As shown by step S312 of FIG. 4, the registration server receives a payment request from the client terminal. In some embodiments, the payment request includes at least the registration code, and a payment amount. In some embodiments, the payment request includes the registration code, the payment account, and the terminal identifier. In some embodiments, the payment request also includes verification information such as user identity information.

As shown by step S313 of FIG. 4, the registration server searches for information and verifies the payment request. For example, the registration server can search for the user identity information can the payment account information based on the registration code. Or the registration server can search for only the payment account information based on the registration code. The registration server may also search for saved user identity information and compared the saved user identity information with the user identity information provided along with the payment request.

It should also be noted that verification can be conducted with different approaches. For example, the registration server may send a verification request message to the client terminal so that the client terminal displays the verification request message and asks the user to enter verification information.

In some embodiments, the verification information entered by the user can be the same type of user identity information provided by the user during the registration process. For example, the user provides a user identity card for registration and the client terminal and/or registration server extracts a name and an identity number from the card; to verify a subsequently submitted payment request, the user, whether or not after specific requests from the registration server, provides a user identity number for verification. The registration server can compare the provided user identity number with the saved information during the registration process. As another example, the user identity information provided by the user during registration includes fingerprint information; the registration server may request the user to enter fingerprint information again for the purpose of verification; the user can enter the fingerprint information to use the client terminal to scan his/her finger tips, allowing the registration server to compare the input fingerprint information with the saved information.

In some embodiments, the verification information does not necessarily have to be compared to information saved during the registration process. The registration server may quest verification information from the user and compare the input verification information with information acquired during other process, e.g. a previous payment transaction that has been verified with the user identity information provided during registration.

As shown by step S314 of FIG. 4, the registration server sends the payment request to the bank server. Along with the payment request, the registration server may also attach an explanation that the payment request has been verified and that the payment can proceed. In addition, as indicated, the verification can be conducted by the bank server. Therefore, the registration server may send the payment request to the bank server before the verification and request the bank server to verify the payment request and grant or deny the payment transaction.

In some embodiments, the terminal identifier can be used as another layer of verification. A terminal identifier associated with the payment request can be automatically acquired by the registration server or the bank server from the client terminal. If the registration server or bank server notices that the terminal identifier associated with the payment request is not the same terminal identifier acquired during registration, the registration server or the bank server may deny the payment request or ask for additional verification from the user.

As shown by step S315 of FIG. 4, the bank server can process the payment based on the payment request. In particular, the bank server may receive the payment request and the confirmation from the registration server that the payment request has been verified. The bank server can identify the payment account based on the registration code and transfer the specified amount indicated in the payment request to or from the payment account.

FIG. 5 is a schematic illustration of an information transmission method, showing how a client terminal, a registration server, and a bank server interact in accordance with some embodiments.

As show by step S401 of FIG. 5, the client terminal may scan one or more information carriers provided by a user of the client terminal to generate one or more images.

As show by step S402 of FIG. 5, the registration server may receive an image from a client terminal.

As show by step S403 of FIG. 5, the registration server may extract user identity information and payment account information from the image.

As show by step S404 of FIG. 5, the registration server may send a confirmation message to the client terminal.

As show by step S405 of FIG. 5, the client terminal may display the confirmation message and requests the user to confirm or modify the extracted information.

As show by step S406 of FIG. 5, the registration server may receive updated information or a confirmation from the client terminal.

As show by step S407 of FIG. 5, the registration server may identify a bank server based on the payment account information.

As show by step S408 of FIG. 5, the registration server may send the user identity information and payment account information to a bank server. In some embodiments, the bank server verifies the information. The registration server may also send a message to the bank server along with the user identity information and payment account information. The message may inform the bank server that a user has started a registration process and the bank server is request to verify whether the use is authorized to access the payment account that can be identified by the payment account information.

As show by step S409 of FIG. 5, the bank server verifies the information. In particular, the bank server verifies whether the user identity information is associated with a payment account identified by the payment account information. In some embodiments, the bank server may be able to conduct the verification based on information that is already saved in the bank server. For example, if the user has entered user identity information when the user established the payment account and he bank server has saved and verified such information; then when the user identity information and payment account information are sent by the registration server, the bank server may access the previously saved information and use such information as a basis for determining whether the user is authorized. The bank server may conduct a search with the payment account information and find the previously saved user identity information. In some embodiments, the search may be conducted with an approximation algorism because there can be errors in extracting the payment account information and the user identity information from the image. If a perfect match cannot be found, the bank server may inquire the user to make modifications to the extracted information so that the errors, if any, can be corrected. After finding the saved user identity information, the bank server can compare the user identity information from the registration server with the saved information.

As show by step S410 of FIG. 5, the registration server may receive verification results from the bank server. If the verification is successful, the registration server proceeds to steps S411-S416. In some embodiments, the verification is not successful. The registration server may terminate the registration directly or send a message to the client terminal so that the client terminal can display the message and notify the user that the verification has failed and request the user to cancel or re-enter the information.

As show by step S411 of FIG. 5, the registration server may generate a registration code for the user if the verification is successful.

As show by step S412 of FIG. 5, the registration server may send the registration code to the client terminal.

As show by step S413 of FIG. 5, the registration server may send the registration code and a terminal identifier to the bank server.

As show by step S414 of FIG. 5, the registration server may establish corresponding relationships between the user identity information, the payment account information, and the registration code. In some embodiments, the registration server may establish corresponding relationships between the registration code and a terminal identifier. In some embodiments, the registration server may establish corresponding relationships between the registration code and the payment account information.

As show by step S415 of FIG. 5, the registration server may send the registration code and a terminal identifier to the bank server.

As show by step S416 of FIG. 5, the terminal identifier can be used to identify the client terminal, and the bank server establishes corresponding relationships between the registration code, the terminal identifier, and the payment account for verifying subsequent payment requests by the client terminal.

Figure 6:
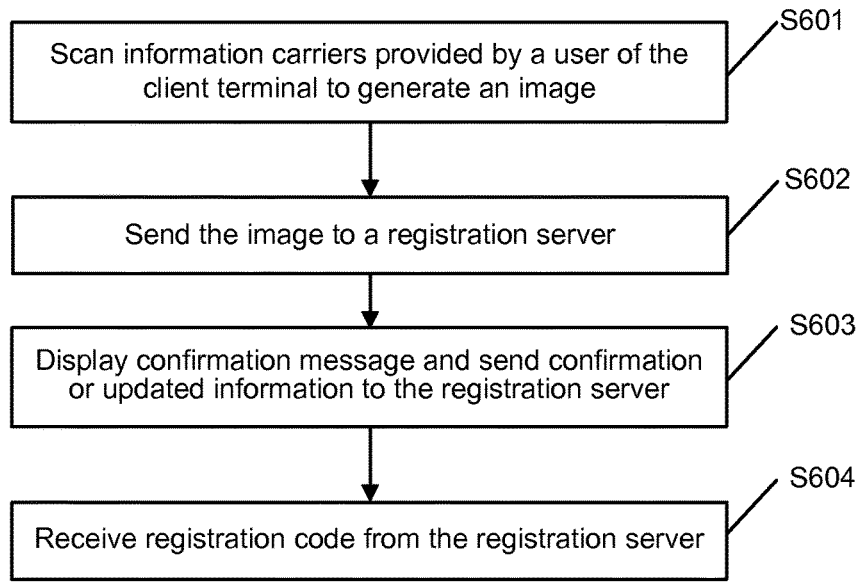
FIG. 6 is a flowchart illustrative of the information registration method based on the operations of the client terminal in accordance with some embodiments.

FIG. 6 is a flowchart of the information registration method based on the operations of the client terminal in accordance with some embodiments.

As shown by step S601 of FIG. 6, the client terminal may scan information carriers provided by a user of the client terminal to generate an image.

As shown by step S602 of FIG. 6, the client terminal may send the image to a registration server. In some embodiments, the client terminal extracts information such as user identity information and payment account information from the image and sends the information to the registration server. In some embodiments, the user identity information and payment account information is encrypted before being sent to the registration server.

As shown by step S603 of FIG. 6, the client terminal displays confirmation message so that the user can confirm or modify the extracted information. In some embodiments, the client terminal sends a confirmation or updated information to the registration server.

As shown by step S604 of FIG. 6, the client terminal receives the registration code from the registration server.

Figure 7:
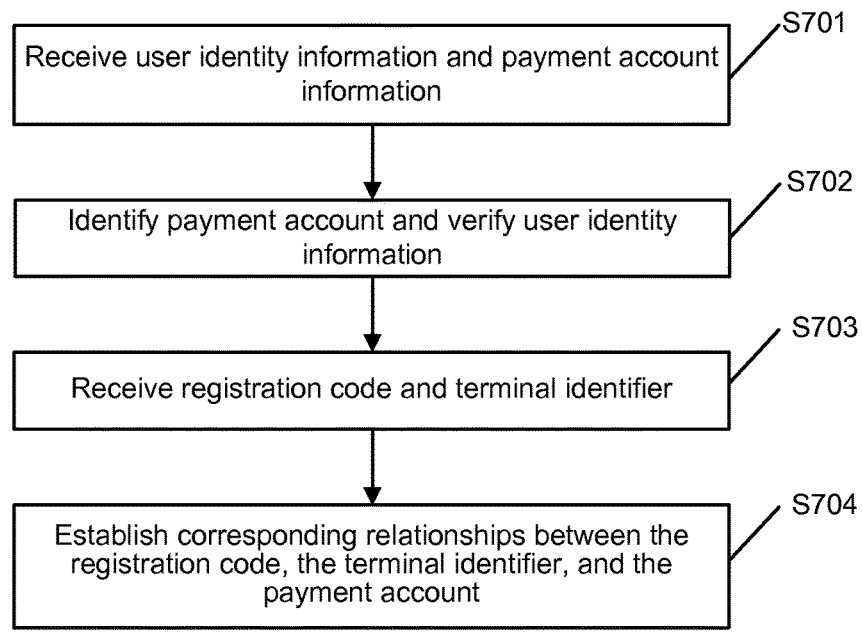
FIG. 7 is a flowchart illustrative of the information registration method based on the operations of the bank server in accordance with some embodiments.

FIG. 7 is a flowchart illustrative of the information registration method in accordance with some embodiments based on the operations of the bank server;

As shown by step S701 of FIG. 7, the bank server receives user identity information and payment account information from the registration server.

As shown by step S702 of FIG. 7, the bank server identifies payment account and verifies user identity information sent by the registration server.

As shown by step S703 of FIG. 7, the bank server receives the registration code and terminal identifier from the registration server. In some embodiments, the terminal identifier is sent by the client terminal to the bank server.

As shown by step S704 of FIG. 7, the bank server establishes corresponding relationships between the registration code, the terminal identifier, and the payment account.

FIG. 8-17 illustrate the devices and systems that may be used to perform the methods described above. To avoid redundancy, not all the details and variations described for the method are herein included for the devices and systems. Such details and variations should be considered included for the description of the devices and as long as they are not in direct contradiction to the specific description provided for the devices and systems.

Figures 8, 9:
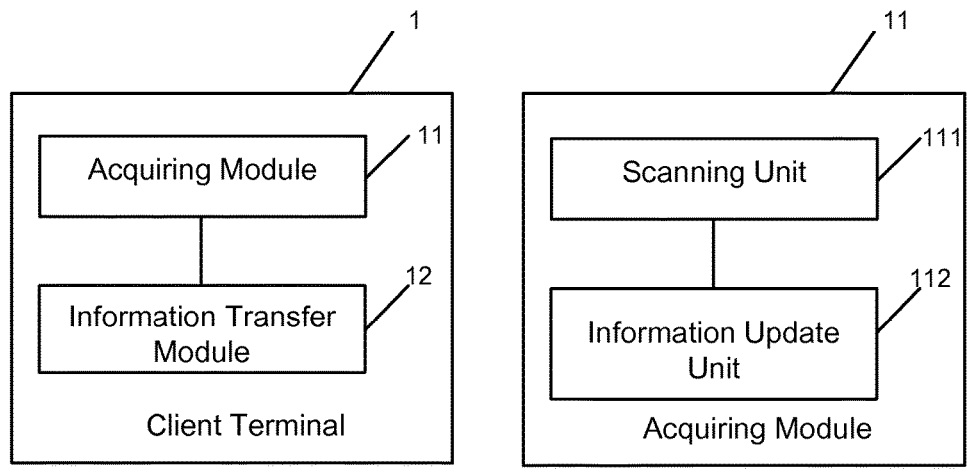
FIG. 8 is a block diagram of a client terminal in accordance with some embodiments.
FIG. 9 is a block diagram of an acquiring module of the client terminal in accordance with some embodiments.

FIG. 8 is a block diagram of a client terminal 1 in accordance with some embodiments. FIG. 9 is a block diagram of an acquiring module of the client terminal in accordance with some embodiments.

As shown in FIG. 8, the client terminal 1 comprises an acquiring module 11 and an information transfer module 12, wherein the acquiring module 11 is configured to acquire information or images carrying information from a user of the client terminal 1, the information includes user identity information and payment account information from the user, and information transfer module 12 is configured to send the information and/or the image from the client terminal 1 to a registration server.

As shown in FIG. 9, the acquiring module 11 may comprise a scanning unit 111 and an information update unit 112, wherein the scanning unit 111 is configured to scan information carriers such as credit cards or user identity card (e.g. driver license), and the information update unit 112 is configured to confirm or update the scanned information such as the scanned user identity information and payment account information, and the information update unit. In particular, the information update unit 112 is configured to receive a confirmation message from the registration server to request the user to confirm or modify the scanned information. The information update unit 112 is also configured to receive the confirmation or the updated information from the user. The information transfer module 12 is further configured to send the confirmation or the updated information to the registration server.

Figure 10:
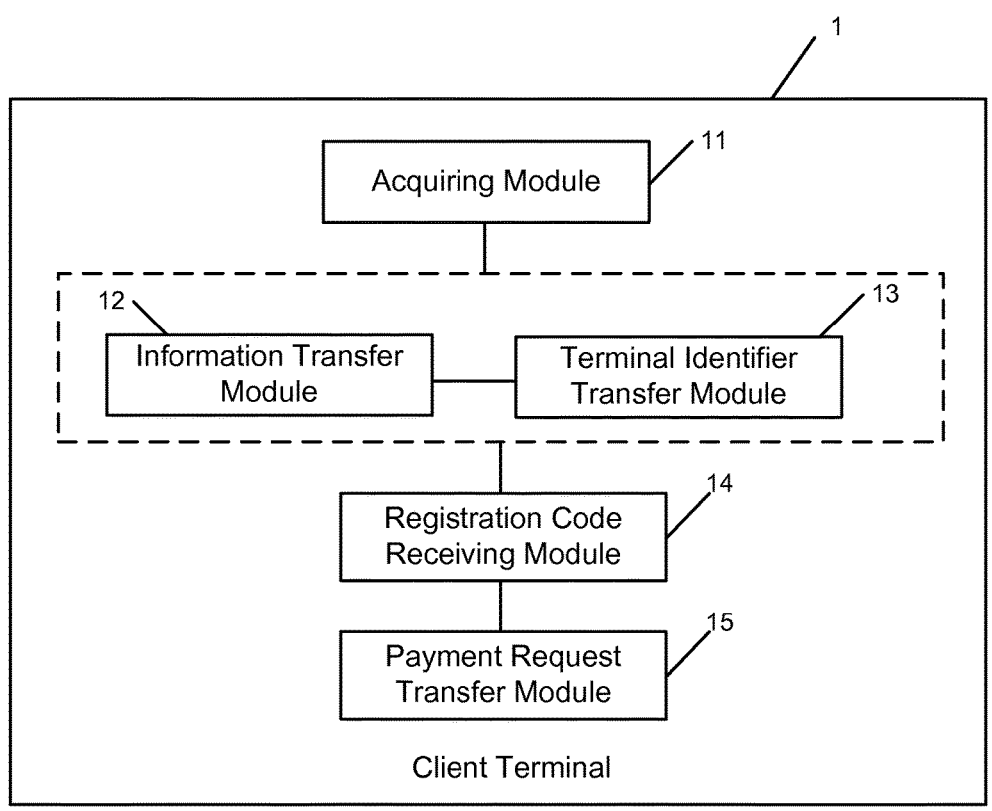
FIG. 10 is a block diagram of a client terminal in accordance with some embodiments.

FIG. 10 is a block diagram of a client terminal in accordance with some embodiments. As shown in FIG. 10, the client terminal 1 may comprise: an acquiring module 11, an information transfer module 12, a terminal identifier transfer module 13, a registration code receiving module 14, and a payment request transfer module 15.

In some embodiments, the acquiring module 11 is configured to acquire information or images carrying information from a user of the client terminal 1, the information transfer module 12 is configured to send the user identity information and payment account information and/or the image from the client terminal 1 to a registration server and further configured to send a confirmation or updated information to the registration server, the terminal identifier transfer module 13 is configured to send a terminal identifier that identifies the client terminal to the registration server, the registration code receiving module 14 is configured to receive the registration code, and the payment request transfer module 15 is configured to send a payment request to the registration server, wherein the payment request comprises a payment amount, the terminal identifier, and the registration code.

Figure 11:
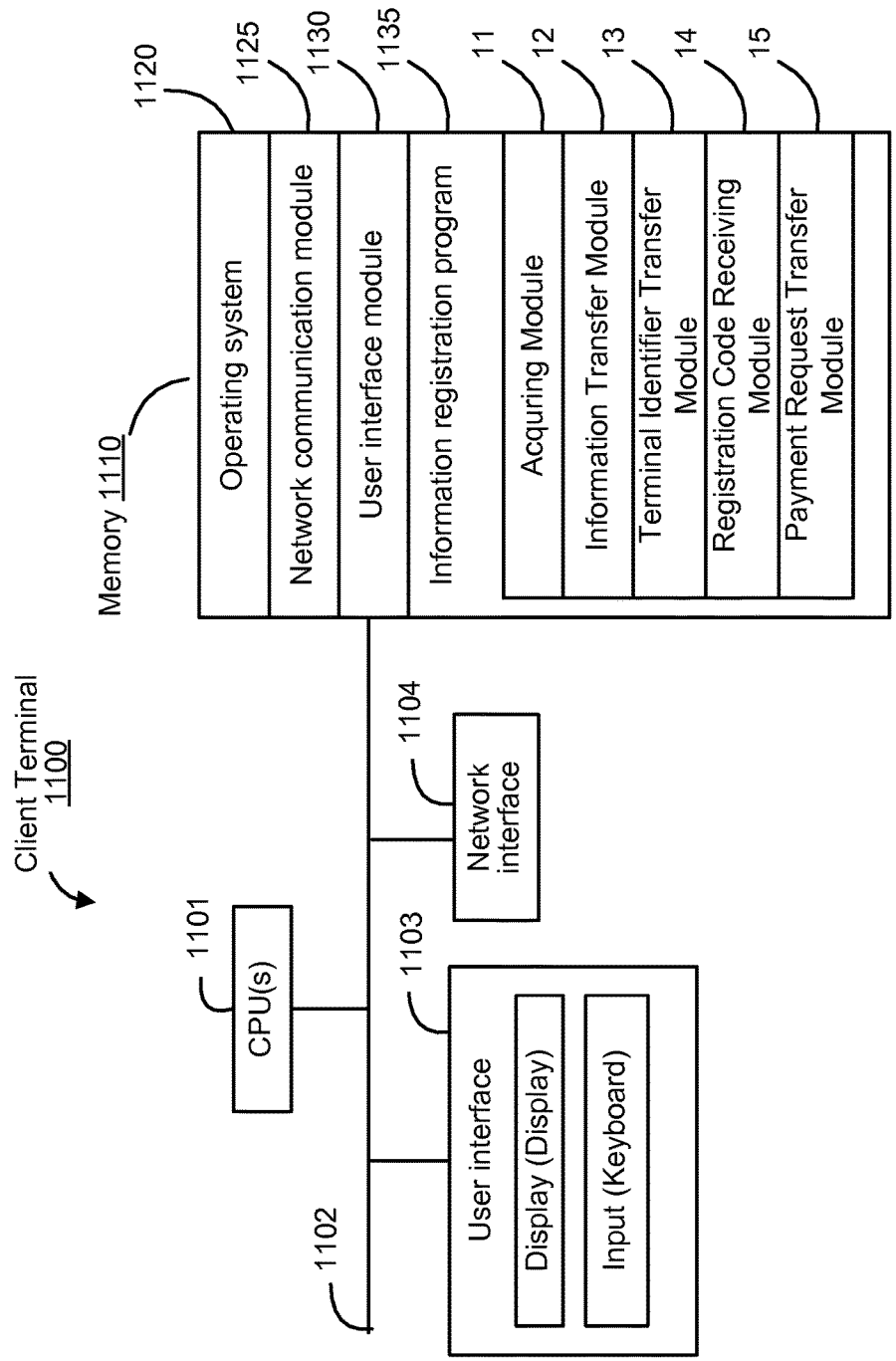
FIG. 11 is a schematic structural diagram of a client terminal in accordance with some embodiments.

FIG. 11 is a schematic structural diagram of a client terminal in accordance with some embodiments.

As shown in FIG. 11, the exemplary client terminal 1100 typically includes one or more processing units (CPU's) 1101, one or more network or other communications interfaces 1104, memory 1110, and one or more communication buses 1102 for interconnecting these components. The communication buses 1102 may include circuitry (sometimes called a chipset) that interconnects and controls communications between system components. The user interface 1103 may include a touch screen, or a display and a keyboard. In some embodiments, the user interface 1103 may further include a standard wired interface and wireless interface, e.g. a Wi-Fi interface. Memory 1110 may include high speed random access memory and may also include non-volatile memory, such as one or more magnetic disk storage devices. Memory 1110 may include mass storage that is remotely located from the CPU's 1101. In some embodiments, memory 1110 stores the following programs, modules and data structures, or a subset or superset thereof:

- an operating system 1120 that includes procedures for handling various basic system services and for performing hardware dependent tasks;
- a network communication module 1125 that is used for connecting the client terminal 1100 to other devices such as the registration server and bank server via one or more communication networks (wired or wireless), such as the Internet, other wide area networks, local area networks, metropolitan area networks, and so on;
- a user interface module 1130 configured to receive user inputs through the user interface 1103;
- and one or more information registration programs 1135 including a number of terminal-side application modules such as the following:
  an acquiring module 11 configured to acquire information or images carrying information from a user of the client terminal;
  an information transfer module 12 configured to send the user identity information and payment account information and/or the image from the client terminal 1100 to a registration server and further configured to send a confirmation or updated information to the registration server;
  a terminal identifier transfer module 13 configured to send a terminal identifier that identifies the client terminal to the registration server;
  a registration code receiving module 14 configured to receive the registration code; and
  a payment request transfer module 15 configured to send a payment request to the registration server, wherein the payment request comprises a payment amount, the terminal identifier, and the registration code.

Figure 12:
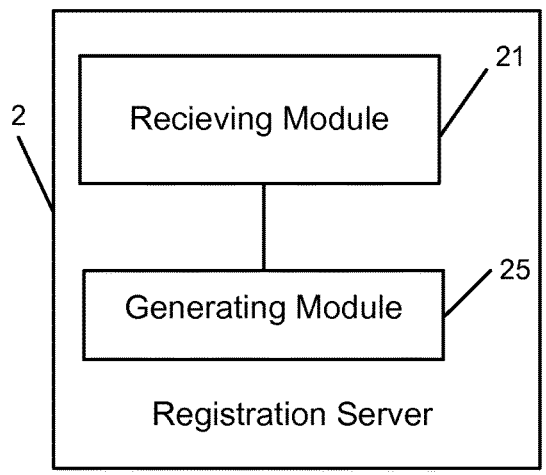
FIG. 12 is a block diagram of a registration server in accordance with some embodiments.

FIG. 12 is a block diagram of a registration server in accordance with some embodiments. The registration server 2 comprises a receiving module 21 and a generating module 25, wherein the receiving module 21 is configured to receive an image from a client terminal, wherein the image is generated by the client terminal through scanning one or more information carriers provided by a user of the client terminal and the generating module 25 is configured to generate a registration code for the user if the verification regarding the association of user identity and payment account is successful.

Figure 13:
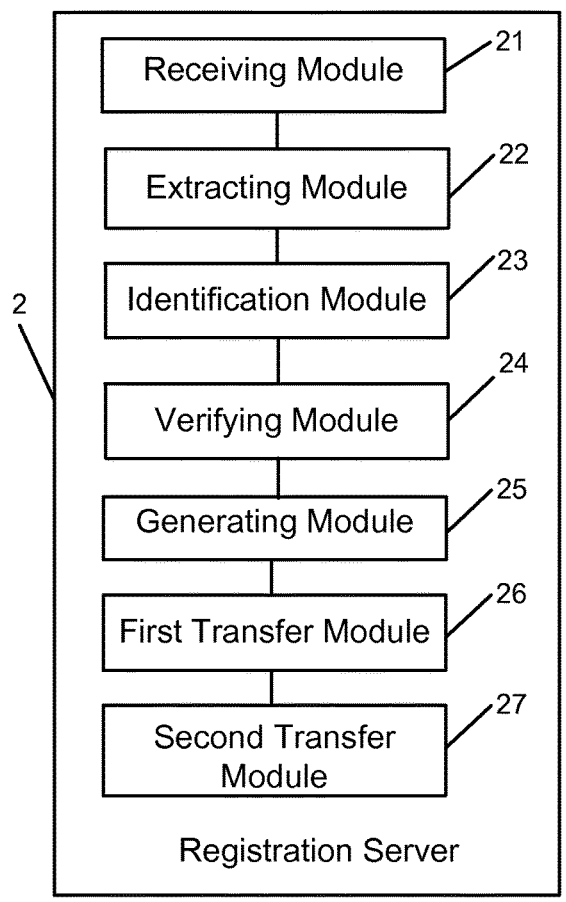
FIG. 13 is a block diagram of a registration server in accordance with some embodiments.

FIG. 13 is a block diagram of a registration server in accordance with some embodiments. The registration server 2 comprises a receiving module 21, an extracting module 22, an identification module 23, a verifying module 25, a generating module 25, a first transfer module 26, and a second transfer module 27.

The receiving module 21 may be configured to receive an image from a client terminal, wherein the image is generated by the client terminal through scanning one or more information carriers provided by a user of the client terminal. The extracting module 22 may be configured to extract user identity information and payment account information from the image. The identification module 23 configured to identify a bank server based on the payment account information. The verifying module 24 may be configured to verify whether the user identity information is associated with a payment account identified by the payment account information. The generating module 25 may be configured to generate a registration code for the user if the verification is successful. The first transfer module 26 may be configured to send the registration code to the client terminal. The second transfer module 27 may be configured to send the registration code and a terminal identifier to the bank server, wherein the terminal identifier identifies the client terminal, and the bank server establishes corresponding relationships between the registration code, the terminal identifier, and the payment account for verifying subsequent payment requests by the client terminal.

Figure 14:
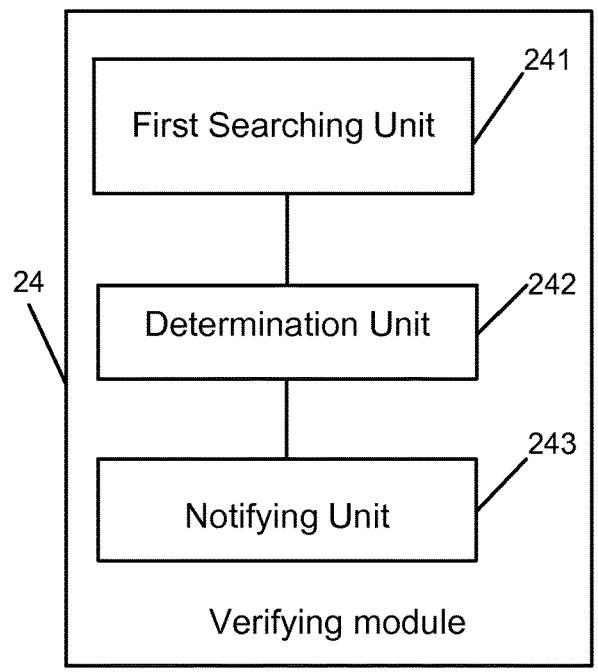
FIG. 14 is a block diagram of a verifying module of the registration server in accordance with some embodiments.

FIG. 14 is a block diagram of the verifying module 24 of the registration server 2 in accordance with some embodiments. The verifying module 24 comprises a first searching unit 241, a determination unit 242, and a notifying unit 243, wherein the first searching unit 241 is configured to search for saved information in the registration server if the verification is conducted by the registration server, the determination unit 242 is configured to determine if the saved information is consistent with the information extracted from the scanned image, and the notifying unit 243 is configured to notify the client terminal or the bank server regarding the results of the verification.

Figure 15:
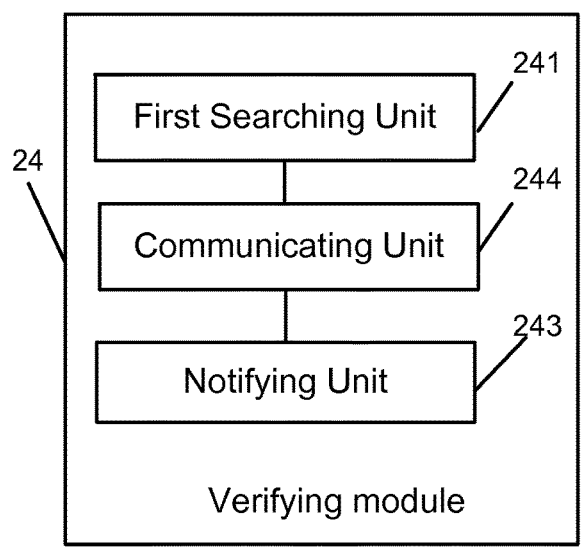
FIG. 15 is a block diagram of a verifying module of the registration server in accordance with some embodiments.

FIG. 15 is a block diagram of the verifying module 24 of the registration server 2 in accordance with some embodiments. The verifying module 24 comprises a first searching unit 241, a communicating unit 244, and a notifying unit 243, wherein the first searching unit 241 is configured to search for saved information in the registration server if the verification is conducted by the registration server, the communicating unit 244 is configured to communicate with the bank server and request the bank server to conduct the verification, and the notifying unit 243 is configured to notify the client terminal or the bank server regarding the results of the verification.

Figure 16:
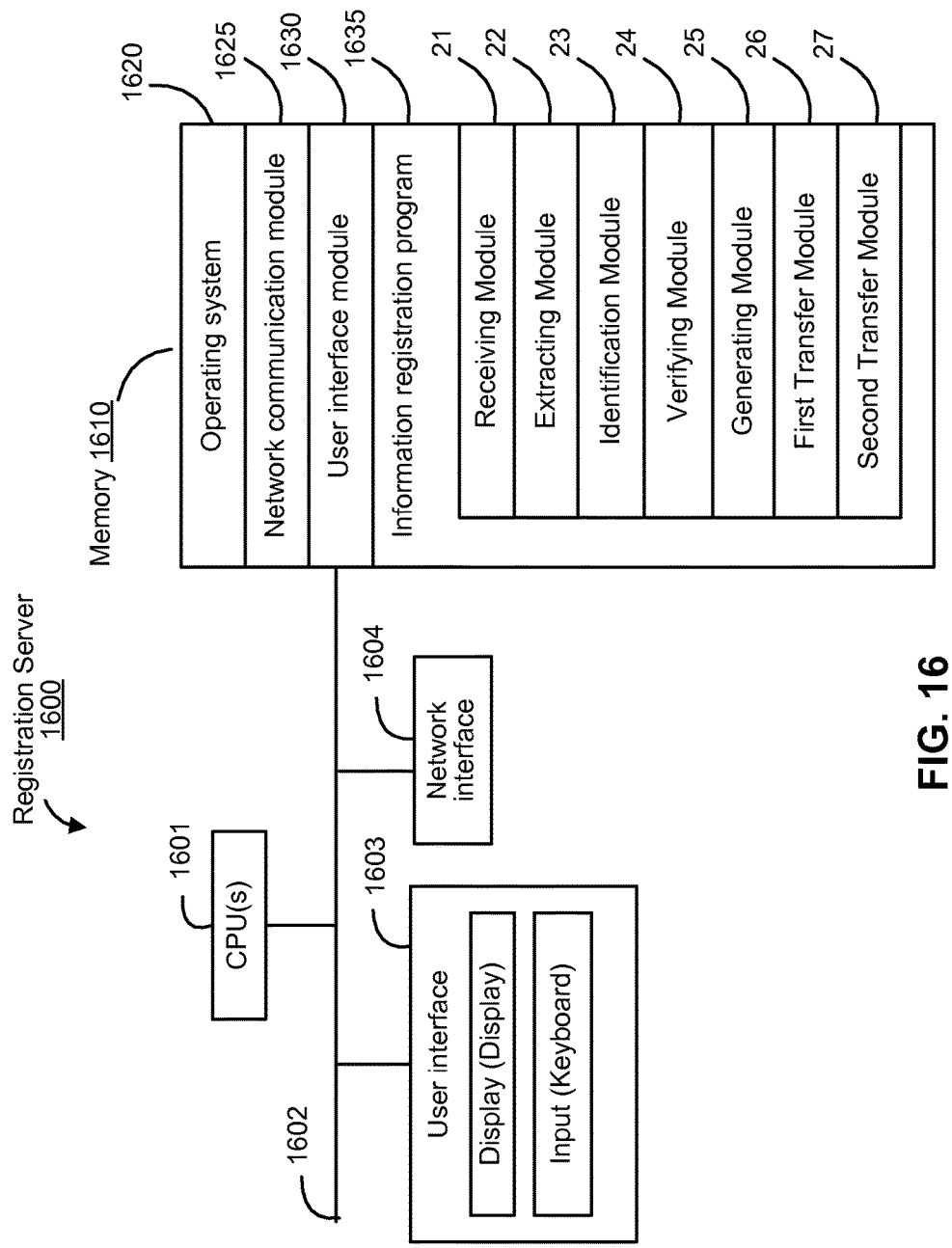
FIG. 16 is a schematic structural diagram of a registration server in accordance with some embodiments.

FIG. 16 is a schematic structural diagram of a registration server in accordance with some embodiments.

As shown in FIG. 16, the exemplary registration server 1600 typically includes one or more processing units (CPU's) 1601, one or more network or other communications interfaces 1604, memory 1610, and one or more communication buses 1602 for interconnecting these components. The communication buses 1602 may include circuitry (sometimes called a chipset) that interconnects and controls communications between system components. The user interface 1603 may include a touch screen, or a display and a keyboard. In some embodiments, the user interface 1603 may further include a standard wired interface and wireless interface, e.g. a Wi-Fi interface. Memory 1610 may include high speed random access memory and may also include non-volatile memory, such as one or more magnetic disk storage devices. Memory 1610 may include mass storage that is remotely located from the CPU's 1601. In some embodiments, memory 1610 stores the following programs, modules and data structures, or a subset or superset thereof:

- an operating system 1620 that includes procedures for handling various basic system services and for performing hardware dependent tasks;
- a network communication module 1625 that is used for connecting the registration server 1600 to other devices such as the client terminal and bank server via one or more communication networks (wired or wireless), such as the Internet, other wide area networks, local area networks, metropolitan area networks, and so on;
- a user interface module 1630 configured to receive user inputs through the user interface 1603;
- and one or more information registration programs 1635 including a number of terminal-side application modules such as the following:
- a receiving module 21 configured to receive an image from a client terminal, wherein the image is generated by the client terminal through scanning one or more information carriers provided by a user of the client terminal;
- an extracting module 22 configured to extract user identity information and payment account information from the image;
- an identification module 23 configured to identify a bank server based on the payment account information;
- a verifying module 24 configured to verify whether the user identity information is associated with a payment account identified by the payment account information;
- a generating module 25 configured to generate a registration code for the user if the verification is successful;
- a first transfer module 26 configured to send the registration code to the client terminal; and
- a second transfer module 27 configured to send the registration code and a terminal identifier to the bank server, wherein the terminal identifier identifies the client terminal, and the bank server establishes corresponding relationships between the registration code, the terminal identifier, and the payment account for verifying subsequent payment requests by the client terminal.

Figure 17:
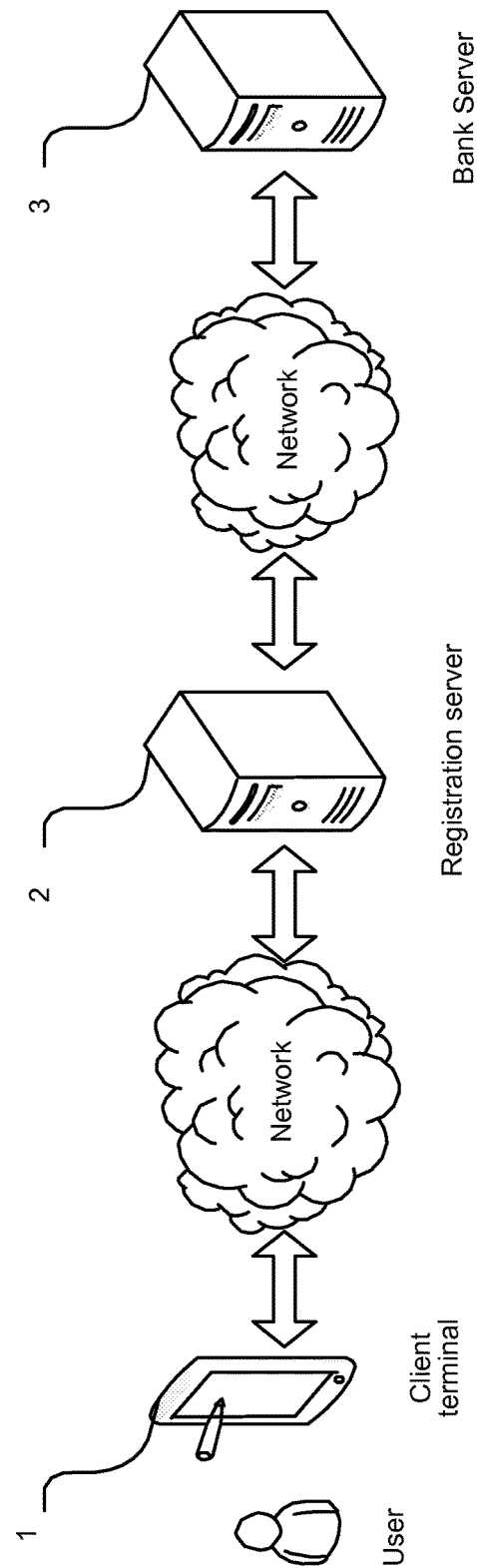
FIG. 17 is a schematic structural diagram of a registration system in accordance with some embodiments.

FIG. 17 is a schematic structural diagram of a registration system in accordance with some embodiments, showing the network environment. As shown in FIG. 17, the system comprises: a client terminal 1, a registration server 2, and a bank server 3, wherein the terminals and servers are connected with a network.

The client terminal 1 scans one or more information carriers provided by a user of the client terminal 1 to generate an image. In some embodiments, the client terminal 1 processes the image and extracts information, such as user identity information and payment account information, from the image. In some embodiments, the image is sent to the registration server 2 so that the registration server extracts the information from the image.

The client terminal 1 displays the extracted information and requests the user to confirm the displayed information or choose to modify the information. If the user confirms the extracted information, the client terminal 1 sends a confirmation to the registration server 2. If the user modifies the extract information, e.g. user identity information and payment account information, the client terminal 1 updates the information and sends the updated information to registration server 2.

The registration server 2 receives the confirmation or the updated information from the client terminal 1 so that the registration server 2 identifies a bank server 3 based on the payment account information.

In some embodiments, the registration server 2 verifies whether the user identity information is associated with a payment account identified by the payment account information. The verification can be conducted by the registration server 2 or by the bank server 3. The verification process may involve information exchanges between the registration server 2 and the bank server 3. For example, the registration server 2 may acquire saved information, e.g. saved user identity information, from the bank server 3, wherein the save user identity information has been located by searching with the payment account information provided by the registration server 2 to the bank server 3. Then the registration server 2 compares the saved user identity information with the user identity information provided by the client terminal 1. If the information matches then the verification is successful. Otherwise, the verification is unsuccessful and the registration server 2 can terminate the registration process or require the user to re-enter the information, either manually or with re-scanning.

If the verification is successful, the registration server 2 generates a registration code for the user and the client terminal 1. The registration server 2 sends the registration code to the client terminal 1. In some embodiments, the registration server 2 establishes corresponding relationships between the registration code, the user identity information, and the payment account information. In some embodiments, the registration server 2 acquires the terminal identifier from the client terminal 1 and establishes corresponding relationships between the payment account information, the registration code, and the terminal identifier.

In some embodiments, the registration server 2 sends the registration code to the bank server 3. In some embodiments, the registration server 2 also sends the terminal identifier to the bank server 3. In some embodiments, the client terminal 1 sends the terminal identifier to the bank server 3.

Although some of the various drawings illustrate a number of logical stages in a particular order, stages that are not order dependent may be reordered and other stages may be combined or broken out. While some reordering or other groupings are mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A payment account registration method, comprising:
at a registration server having one or more processors and memory storing programs executed by the one or more processors,
receiving an image from a client terminal, wherein the image is generated by the client terminal through scanning one or more information carriers provided by a user of the client terminal;
extracting user identity information and payment account information from the image;
identifying a bank server based on the payment account information;
verifying whether the user identity information is associated with a payment account identified by the payment account information;
generating a registration code for the user if the verification is successful;
sending the registration code to the client terminal; and
sending the registration code and a terminal identifier to the bank server, wherein the terminal identifier identifies the client terminal, and wherein the bank server establishes corresponding relationships between the registration code, the terminal identifier, and the payment account for verifying subsequent payment requests by the client terminal.

2. The method of claim 1, wherein:
the user identity information comprises a name and an identifying number of the user associated with the client terminal.

3. The method of claim 1, further comprising:
sending a confirmation message to the client terminal for display at the client terminal, wherein the confirmation message comprises the user identity information and payment account information extracted from the image, and requests the user to confirm or modify the extracted user identity information and bank account information.

4. The method of claim 3, further comprising:
receiving updated user identity information and bank account information from the client terminal if the user modifies the extracted user identity information and bank account information at the client terminal; and
replacing the extracted user identity information and bank account information with the updated user identity information and bank account information.

5. The method of claim 3, further comprising:
receiving a confirmation from the client terminal if the user confirms the user identity information and bank account information at the client terminal.

6. The method of claim 1, wherein:
an association between the user identity information and the payment account is verified by acquiring saved information from the bank server and comparing the saved information to the user identity information.

7. The method of claim 1, further comprising:
sending a verification result to the client terminal after verifying whether the user identity information is associated with the payment account.

8. The method of claim 1, wherein:
the registration code comprises a user name and a password.

9. The method of claim 1, further comprising:
receiving a payment request from the client terminal, wherein the payment request includes a payment amount, the terminal identifier, and the registration code;
verifying the payment request; and
sending the payment request to the bank server, wherein the bank server processes a payment from the payment account based on the payment request.

10. A registration server having:
one of more processors;
memory; and
one or more programs modules stored in the memory and configured for execution by the one or more processors, the one or more program modules including:
a receiving module configured to receive an image from a client terminal, wherein the image is generated by the client terminal through scanning one or more information carriers provided by a user of the client terminal;
an extracting module configured to extract user identity information and payment account information from the image;
an identification module configured to identify a bank server based on the payment account information;
a verifying module configured to verify whether the user identity information is associated with a payment account identified by the payment account information;
a generating module configured to generate a registration code for the user if the verification is successful;
a first transfer module configured to send the registration code to the client terminal; and
a second transfer module configured to send the registration code and a terminal identifier to the bank server, wherein the terminal identifier identifies the client terminal, and the bank server establishes corresponding relationships between the registration code, the terminal identifier, and the payment account for verifying subsequent payment requests by the client terminal.

11. The registration server of claim 10, wherein:
the user identity information comprises a name and a identifying number of the user associated with the client terminal.

12. The registration server of claim 10, further comprising a confirmation module, wherein:
the confirmation module is configured to send a confirmation message to the client terminal to be displayed by the client terminal, wherein the confirmation message comprises the user identity information and payment account information extracted from the image, and the confirmation message requests the user to confirm or modify the extract user identity information and bank account information.

13. The registration server of claim 12, wherein the confirmation module is further configured to:

receive updated user identity information and bank account information from the client terminal if the user modifies the extracted user identity information and bank account information; and replace the extracted user identity information and bank account information with the updated user identity information and bank account information at the client terminal.

14. The registration server of claim 12, wherein the confirmation module is further configured to:

receive the confirmation from the client terminal if the user confirms the user identity information and bank account information.

15. The registration server of claim 10, wherein:

an association between the user identity information and the payment account is verified by acquiring saved information from the bank server and comparing the saved information to the user identity information.

16. The registration server of claim 10, further comprising a payment processing module, wherein the payment processing module is configured to:

receive a payment request from the client terminal, wherein the payment request includes a payment amount, the terminal identifier, and the registration code;

verify the payment request; and send the payment request to the bank server, wherein the bank server processes a payment from the payment account based on the payment request.

17. A non-transitory computer readable storage medium having stored therein one or more instructions, which, when executed by a registration server, cause the registration server to:

receive an image from a client terminal, wherein the image is generated by the client terminal through scanning one or more information carriers provided by a user of the client terminal;

extract user identity information and payment account information from the image;

identify a bank server based on the payment account information;

verify whether the user identity information is associated with a payment account identified by the payment account information;

generate a registration code for the user if the verification is successful;

send the registration code to the client terminal; and send the registration code and a terminal identifier to the bank server, wherein the terminal identifier identifies the client terminal, and the bank server establishes corresponding relationships between the registration code, the terminal identifier, and the payment account for verifying subsequent payment requests by the client terminal.

18. The non-transitory computer readable storage medium of claim 17, wherein the instructions further cause the registration server to:

send a confirmation message to be displayed by the client terminal, wherein the confirmation message comprises the extracted user identity information and bank account information, and the confirmation message requests the user to confirm or modify the extracted user identity information and bank account information.

19. The non-transitory computer readable storage medium of claim 18, wherein the instructions further cause the registration server to:

receive updated user identity information and bank account information from the client terminal if the user modifies the extracted user identity information and bank account information; and replace the extracted user identity information and bank account information with the updated user identity information and bank account information at the client terminal.

20. The non-transitory computer readable storage medium of claim 18, wherein the instructions further cause the registration server to:

receive the confirmation from the client terminal if the user confirms the user identity information and bank account information.

\* \* \* \* \*